United States Patent [19]

Goodzeit et al.

[11] Patent Number: 5,343,398
[45] Date of Patent: Aug. 30, 1994

[54] SPACECRAFT ROLL-YAW COMPENSATOR WITH ORBIT-RATE AND HARMONIC BANDPASS FILTERS

[75] Inventors: Neil E. Goodzeit, East Windsor; Michael A. Paluszek, Lawrenceville; Kidambi V. Raman, East Windsor, all of N.J.; Eric V. Wallar, New York, N.Y.

[73] Assignee: General Electric Co., East Windsor

[21] Appl. No.: 872,960

[22] Filed: Apr. 23, 1992

[51] Int. Cl.$^5$ .................... G06F 15/50; B64G 1/36
[52] U.S. Cl. .................... 364/434; 364/459; 244/164
[58] Field of Search ............. 364/434, 459; 244/164, 244/166, 165, 171

[56] References Cited

U.S. PATENT DOCUMENTS

| | | | |
|---|---|---|---|
| 3,429,524 | 2/1969 | Buckingham et al. | 244/1 |
| 3,813,067 | 5/1974 | Mork | 244/3.22 |
| 4,521,855 | 6/1985 | Lehner et al. | 364/434 |
| 4,791,573 | 12/1988 | Zemany et al. | 364/454 |
| 4,911,385 | 3/1990 | Agrawal et al. | 244/165 |
| 5,025,381 | 6/1991 | Goodzeit et al. | 364/434 |
| 5,100,084 | 3/1992 | Rahn et al. | 244/165 |

FOREIGN PATENT DOCUMENTS

1549544  8/1979  France .................. G05D 1/08

OTHER PUBLICATIONS

"High Pointing Accuracy with a Momentum Bias Attitude Control System", Journal of Guidance and Control, vol. 3, No. 3, May–Jun. 1980.

"The Synthesis of Regulator Logic Using State-Variable Concepts," Bryson et al, Proceedings of the IEEE, vol. 58, No. 11, Nov. 1970.

"Attitude Control of a Communication Satellite During Stationkeeping Using a Yaw Estimator," Spector et al, pp. 125–134 ca. 1980, American Institute of Aeronautics and Astronautics.

*Primary Examiner*—Thomas G. Black
*Assistant Examiner*—Susan Wieland
*Attorney, Agent, or Firm*—W. H. Meise; C. A. Berard; S. A. Young

[57] ABSTRACT

A pitch momentum stabilized spacecraft includes an earth sensor for generating roll signals. The roll signals are applied to torquers for proportional (P) or proportional-integral PI control of roll and yaw. According to the invention, the sensed roll signals are bandpass filtered at the orbit rate, phase adjusted and applied to the roll and yaw torquers for closing a high gain degenerative feedback loop at the orbit rate, which reduces orbit-rate components of roll and yaw. A second bandpass filter at the second harmonic of the orbit rate is also connected to the earth sensor, for producing second harmonic signals, which are phase controlled and summed with the fundamental orbit rate signals, for degeneration of attitude perturbations occurring at twice the orbit frequency.

20 Claims, 2 Drawing Sheets

SPACECRAFT ROLL-YAW COMPENSATOR WITH ORBIT-RATE AND HARMONIC BANDPASS FILTERS

BACKGROUND OF THE INVENTION

This invention relates to spacecraft attitude control systems, and more particularly to such systems using sensed roll applied to a compensator, which uses orbit-rate bandpass filtering to reduce roll and yaw.

Satellites or spacecraft are in widespread use as platforms for communications systems and sensors. Advances in spacecraft design have resulted in spacecraft which carry progressively larger solar panels to provide power for increasingly more sophisticated electronic systems and more powerful transmitters, and which also carry progressively larger antenna structures for increasingly complex beamforming applications. These more advanced systems often require high pointing accuracy for their sensors and or antennas, so 3-axis stabilization of the satellite body is required.

As the satellite structures become larger, the environmental torques exerted on the spacecraft, as by solar wind, light or photon pressure, magnetic fields, particles and the like, tend to become greater. These larger disturbance torques tend to cause greater attitude perturbations than those experienced with smaller spacecraft, which tends to degrade the pointing accuracy.

An article entitled THE SYNTHESIS OF REGULATOR LOGIC USING STATE-VARIABLE CONCEPTS, by Bryson and Luenberger, appeared at pp 1803-1811 of the PROCEEDINGS OF THE IEEE Vol. 58, No. 11, November, 1970, and constitutes a primer for automatic control systems. As described at pages 1805 and 1806, an auxiliary dynamic system is termed a "filter" which is used to "estimate . . . state variables" of a system. This filter, used with state-variable feedback, constitutes a "compensator". A special filter design termed "observer" may be used to estimate x(t), in a system defined by x=Fx+Gu, when the system input u(t), the system output z(t)=Hx(t), initial conditions x(t₀), and F and G are known. An open-loop estimate (x) of x(t) may be made by applying u(t) to the system, $$\hat{x} = F\hat{x} + Gu \tag{1}$$

but the open-loop estimate, in practice, quickly becomes inaccurate because F, G, u(t) and x₀(t) are never accurately known. This difficulty is overcome by a closed-loop estimator termed an "observer", in which the closed-loop error z-Hx is fed back into equation (1) to produce $$\hat{x} = F\hat{x} + Gu + K(z - H\hat{x}) \tag{2}$$

These principles have been applied to satellite control, as described, for example, in U.S. Pat. No. 3,813,067, issued May 28, 1974 in the name of Mork. The Mork attitude control system does not require knowledge of yaw angle and therefore does not need sun-sensors or gyroscopes. It is advantageous to operate, if possible, without sun sensors and or gyroscopes, for they tend to be less reliable than some other types of sensors. In the Mork arrangement, a gimballed momentum source or wheel is oriented for momentum, principally along the pitch axis, but may be moved on its gimbals, whereby measurements of roll and yaw gimbal angles ($\gamma_x$, $\gamma_y$, respectively) give a basis for determining measured momentum values ($H_{\omega x}$, $H_{\omega z}$) along these axes. The yaw and roll axes are stabilized by the gyroscopic stiffness along the pitch axis. The yaw accuracy of the Mork system is improved by torque compensation logic, which models the expected disturbances about the roll and yaw axes, and which provides correction signals to the yaw and roll gimbal controls.

Mork's torque compensation logic receives as inputs a roll error signal ($\phi$) from one or more roll sensors, and the roll and yaw gimbal angle ($\gamma_x$, $\gamma_z$) signals. The roll error signal $\phi$ and the roll gimbal signal $\gamma_x$ determine the measured momentum. The logic produces yaw gimbal angle command signal $\gamma_{zc}$. The yaw gimbal is coupled to receive $\gamma_{zc}$ from the logic, and the gimbal angles are controlled by a gimbal motor to provide 3-axis stabilization by the reaction torques caused by the changing gimbal angles. Mork's logic multiplies $\gamma_x$, the roll gimbal angle, by a constant $\omega_o$, and adds to the result a compensation signal derived from signals representative of the momentum control torque about the roll axis, including yaw magnet drive, to thereby produce a first intermediate signal. Also, roll error signal $\phi$ is multiplied by a constant $K_2$, to generate a product $K_2\phi$ which is integrated to produce a second intermediate signal. The second intermediate signal is added to the product of a constant $K_1$ multiplied by $\phi$ to produce a third intermediate signal, which is added to the integral of the first intermediate signal to produce the desired yaw gimbal command signal for application to the yaw gimbal.

U.S. Pat. No. 4,521,855, issued June 4, 1985 in the name of Lehner et al., describes a satellite 3-axis control system with momentum bias along the pitch axis. The yaw accuracy of the Lehner et al. system is improved by an apparatus for estimating and directly correcting yaw error, thereby avoiding the need for a sun sensor. FIG. 1 is a simplified block diagram of the Lehner arrangement. An earth sensor assembly (ESA) 10 measures the roll error angle and produces a roll error signal as well as a pitch error signal. An electronic logic arrangement (estimator) 12 is coupled to roll sensor 10 to estimate the yaw error, using the roll error and the measured momentum about the yaw axis as inputs. The roll signals, and the estimated yaw error, and disturbance torque signals produced by estimator 12 are summed together in a summer 14 to produce torquer drive signals. The torquer drive signals are applied to a magnetic torquer drive unit illustrated as a block 16, which applies appropriate signals to one or more coils of a set of torquer coils, illustrated together as a coil 18. In order to distinguish disturbance torques acting on the spacecraft from the effects of the magnetic torquing commanded by the estimator, the estimator must be provided with information relating to the torque contributed by the torquer. A feedback path illustrated as 20 is coupled from magnetic torquer drive 16 to estimator 12, and couples magnetic torquer drive signals to the estimator, where the torquer contribution may be subtracted from the overall disturbances to produce the environmental disturbance torques.

It has been discovered that the magnetic torques generated by the magnetic torquers may differ considerably from the commanded value, because of variations in the earth's magnetic field. Since the magnetic torques are subtracted from the total disturbing torques to produce environmental torques, this difference between commanded and actual torque may result in very large inaccuracies in the estimated disturbance torques, resulting in substantial errors in the yaw pointing accuracy. Inaccuracies in the magnetic coil current, which may be due to source voltage or temperature effects, may also affect the actual torque.

An improved roll-yaw control system is desired.

SUMMARY OF THE INVENTION

An attitude control system and method for 3-axis control of a spacecraft includes provision of momentum bias along the pitch axis by use of a wheel. A roll angle sensor is provided. Proportional (P) or Proportional-Integral (PI) control of yaw torquers for at least yaw stabilization is provided. In a particular embodiment of the invention, PI control of roll torquers is also provided for roll stabilization. Each torquer is a magnetic torquer in one embodiment of the invention, with a wheel pivot for augmentation. A bandpass filter is coupled between the roll sensor and at least the yaw torquer for providing the control system with high gain at either the fundamental orbital rate or a harmonic thereof. In a particular embodiment, the bandpass filter is tuned to the fundamental orbital rate of 11.6 $\mu$Hz. In another embodiment of the invention, further bandpass filter(s) at other harmonics of the orbital rate are coupled in parallel with the first bandpass filter, so that the control system responds to the sum of two harmonic orbital-rate signals. Phase compensation is applied to the output of the bandpass filters. The outputs of the phase compensators are used to calculate the yaw and roll torque demands. The phase compensators are selected to minimize yaw and roll errors.

DESCRIPTION OF THE INVENTION

In a particular application for a 3-axis satellite control system, it was discovered that significant environmental roll disturbances occurred at the fundamental orbital rate, and that significant yaw disturbances occurred at the fundamental orbital rate or frequency and at its first harmonic frequency, also known as a "second" harmonic because it occurs at twice the frequency of the fundamental.

Figure 1:
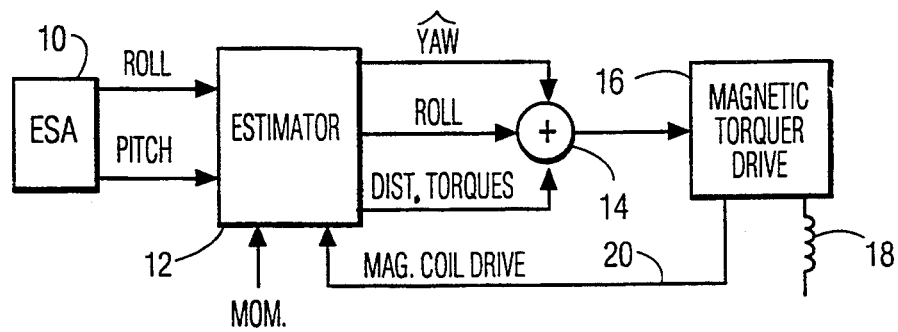
FIG. 1 is a simplified block diagram of a prior art attitude control system using a yaw estimator.
Figure 2:
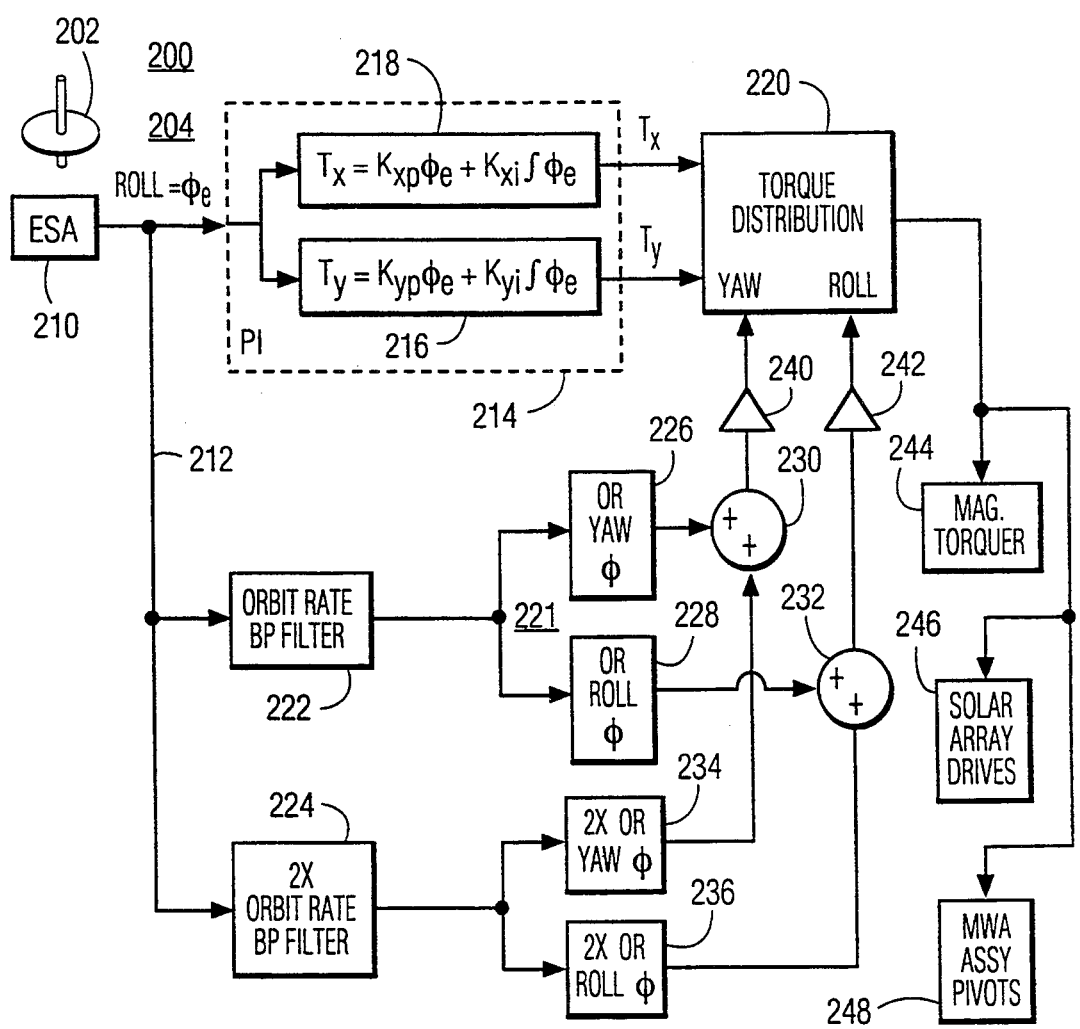
FIG. 2 is a simplified block diagram of a spacecraft with a phase frequency selector attitude control system according to the invention.

FIG. 2 is a simplified block diagram of a satellite 200 with momentum bias provided along the pitch axis by a wheel 202, and also including a control system 204 in accordance with the invention. In FIG. 2, control system 204 includes an earth sensor assembly (ESA) 210, which produces at least roll-representative signals. The roll-representative signals are applied by way of a data path 212 to a proportional-integral controller 214, which includes arrangements for calculating the torque demand (T) in yaw ($T_x$) and roll ($T_y$) directions from the roll error $\Phi_e$. A Block 216 calculates roll torque demand $$T_y = K_{yp}\Phi_e + K_{yi}\int \Phi_e \tag{3}$$

and another block 218 calculates yaw torque demand $$T_x = K_{xp}\Phi_e + K_{xi}\int \Phi_i \tag{4}$$

where $K_{yp}$, $K_{yi}$, $K_{xp}$, $K_{xi}$ are the proportional and integral gains.

The resulting yaw and roll torque demands, $T_x$ and $T_y$, respectively, are applied to a torque distribution matrix illustrated as a block 220.

The roll error signal $\Phi_e$ produced by ESA 210 of FIG. 2 is also applied to a phased frequency selector designated generally as 221. Phased frequency selector 221 includes a bandpass filter 222 tuned to a frequency corresponding to the fundamental orbital rate. For a geosynchronous satellite, the orbit rate is 24 hours, corresponding to about 11.6 $\mu$Hz. The roll error signals are applied to orbit rate bandpass filter 222 and to a 2X orbit (23.2 $\mu$Hz) orbit rate bandpass filter 224.

The orbit-rate signals from orbit-rate bandpass filter 222 are applied to orbit-rate (OR) yaw phase adjuster 226 and to OR roll phase ($\Phi$) adjuster 228. The phase-adjusted orbit-rate yaw and roll signals may be applied directly to amplifiers 240 and 242, respectively, in the absence of perturbations at rates greater than the orbit rate or, as illustrated, they may be applied by way of summing circuits. The phase-adjusted OR signals from adjusters 226 and 228 are applied to noninverting (+) inputs of summing circuits 230 and 232, respectively. Within summing circuits 230 and 232, the orbit rate yaw signals are summed with 2X orbit rate yaw signals from filter 224, phase-adjusted by 2X OR yaw phase adjuster 234, and orbit rate roll signals are summed with 2X OR roll signals, phase-adjusted by 2X OR roll phase adjuster 236. The addition of the 2X OR signals to the basic orbit-rate bandpass signals aids in compensating for attitude perturbations which occur at rates equal to twice orbitrate.

The summed OR and 2X OR phase controlled yaw and roll signals produced by summing circuits 230 and 232 are applied to torque distribution matrix 220 by way of paths including amplifiers illustrated as 240 and 242, respectively. Amplifiers 240 and 242 merely represent gain in the associated paths, and may be inherent (requiring no physical amplifier), or may include gain at any point, or at a number of points, between ESA 210 and distribution matrix 220. Distribution matrix 220 sums the summed and phased yaw torque demand from summing circuit 230 with torque demand $T_x$ from block 218, together with the summed and phased roll torque demand from summing circuit 232 with torque demand $T_y$ from block 216, to produce a net torque demand about each axis. The torque demands are distributed by matrix 220 to the appropriate ones of magnetic torquers, solar array drive and/or momentum wheel assembly (MWA) pivot drives, illustrated by blocks 244, 246 and 248, respectively.

The OR yaw and roll phase adjusters 226 and 228, and the 2X OR yaw and roll phase adjusters 234 and 236, are adjusted so that the closed feedback loop, including the spacecraft dynamics, are degenerative. In particular, each frequency selector 222, 224 of FIG. 2 has the transfer function $$G(s) = \frac{1}{s^2 + 2\rho\omega s + \omega^2} \tag{5}$$

where ω is the filter selection frequency, i.e. 11.6 μHz, 23.2 μHz, etc.; and ρ is the damping ratio, which should be much less than unity in order to allow amplification.

Also, each phase selector 226, 228, 234, 236 of FIG. 2 is characterized by a transfer function $$G(s) = \frac{N_1 s^2 + N_2 s + N_3}{D_1 s + D_2} \tag{6}$$

where $N_1$, $N_2$, and $N_3$, $D_1$ and $D_2$ are filter coefficients selected to provide satisfactory perturbation rejection at the selection frequencies, and to provide satisfactory closed-loop stability factors. Those skilled in the art know that, under some circumstances, some of the coefficients reduce to zero, and also know how to calculate and/or simulate, for a particular satellite and orbit, to establish the coefficients for the desired response.

Figure 3A:
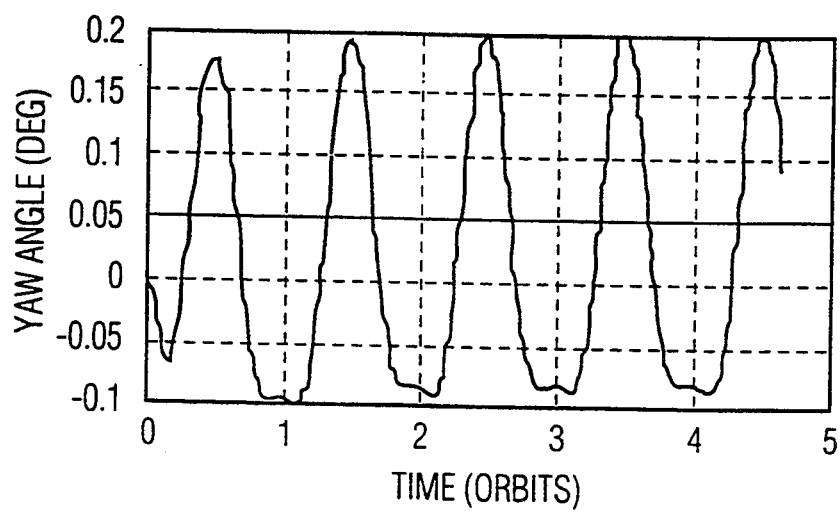
FIG. 3a is a plot of the yaw pointing in a simulation of a prior art control system.
Figure 3B:
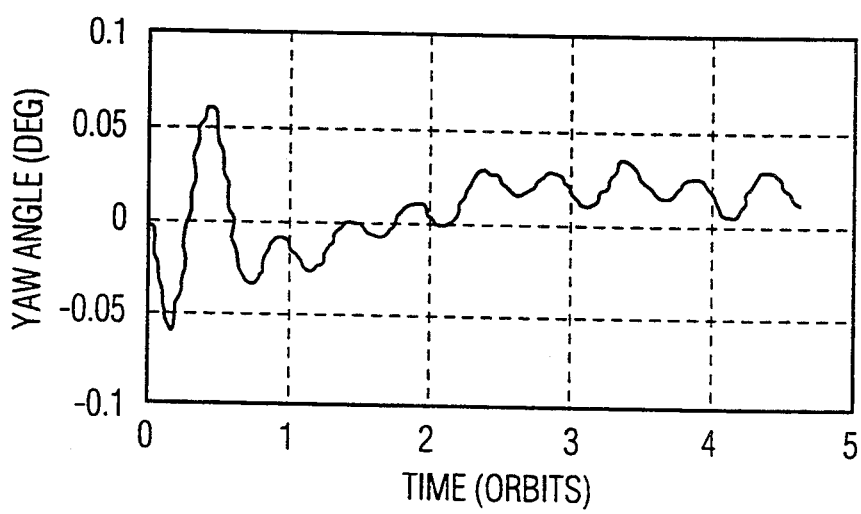
FIG. 3b is a plot of yaw pointing in a simulation including the invention.

FIG. 3a illustrates a plot of calculated yaw pointing performance or error for a spacecraft with a prior-art skew-dipole, proportional yaw/roll control system. As illustrated, the yaw displays cyclic variations, with a large and obvious component at the orbit rate. The peaks and valleys of the yaw are asymmetrical, which is indicative of disturbances at rates higher than the orbit rate. The flattening of one peak more than the other indicates presence of an odd harmonic disturbance, such as a 3rd harmonic. FIG. 3b illustrates calculated yaw pointing performance of the same spacecraft as that of FIG. 3a, with the yaw-roll control further incorporating an orbit rate and 2X orbit rate phased frequency selector, as described in conjunction with FIG. 2. As illustrated in FIG. 3b, the peak excursions are much smaller than in FIG. 3a, especially in view of the expanded vertical scale in FIG. 3b. This represents an almost tenfold reduction in error.

Figure 4:
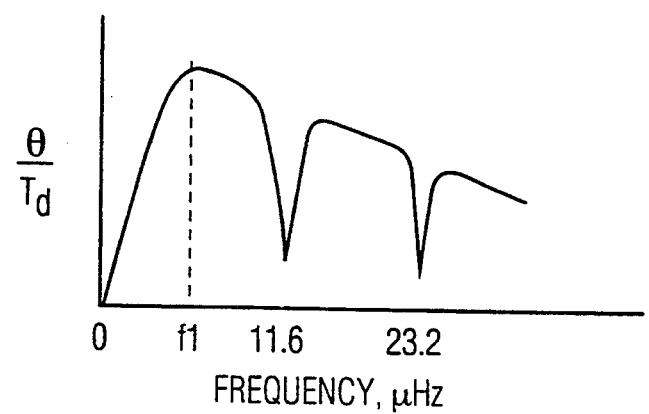
FIG. 4 is a plot of error response versus frequency for a control system according to the invention.

FIG. 4 is a plot of normalized error response $\theta/T_d$ versus frequency, for a spacecraft controlled by a phased frequency selector as described in conjunction with FIG. 2. An ideal response would be a plot congruent with the frequency axis, i.e. $\theta/T_d=0$. In FIG. 4, the amount of angular error $\theta$ resulting from a disturbance torque $T_d$ approaches zero at low frequencies, at which the loop gain is high. At frequencies above zero, the overall response degrades up to a frequency $f_1$ as the loop gain decreases, and above $f_1$ the overall response improves because the dynamics and momentum of the spacecraft tends to suppress disturbances. At 11.6 and 23.2 μHz, the high loop gain drives the attitude error to low values.

Other embodiments of the invention will be apparent to those skilled in the art. In particular, additional selectors for flow of signals at other orbital rates may be used in conjunction with the fundamental and second harmonics. While the described system uses phased frequency selection for control of both yaw and roll, it is possible to used phased frequency selection as described to control only one axis, such as yaw, while controlling the other axes in other manners.

What is claimed is:

1. An attitude control system for a spacecraft orbiting a heavenly body, said spacecraft being associated with pitch, roll and yaw axes, said spacecraft comprising:
    wheel means coupled to said spacecraft, for providing momentum bias along the pitch axis of said spacecraft;
    torquing means coupled to said spacecraft for creating control torques about at least said yaw axis of said spacecraft;
    roll angle sensing means coupled to said spacecraft, for generating signals representative of roll angle;
    first control means coupled to said roll angle sensing means and to said torquing means for providing at least proportional feedback for control of said yaw of said spacecraft;
    orbit rate bandpass filter means tuned to a frequency corresponding to one of the fundamental and a harmonic of the orbital rate of said spacecraft about said heavenly body, for generating an orbit rate filtered signal; and
    coupling means coupled to said roll angle sensing means, and to said torquing means, for forming a high gain feedback control loop by which said orbit rate filtered signals are applied to said torquing means with phase selected for reducing at least said yaw of said spacecraft.

2. A spacecraft according to claim 1, wherein said wheel means comprises a single momentum wheel with its rotational axis at least approximately parallel with said pitch axis.

3. A spacecraft according to claim 1 wherein said torquing means comprises magnetic torquing means.

4. A spacecraft according to claim 1 wherein said roll angle sensing means comprises an earth sensor.

5. A spacecraft according to claim 1, wherein said orbit rate bandpass filter means is tuned to said fundamental of said orbital rate.

6. A spacecraft according to claim 5 wherein said bandpass filter has a center frequency at about 11.6 μHz.

7. A spacecraft according to claim 6, wherein said further coupling means comprises summing means coupled to said orbit rate and second bandpass filter means for summing said orbital rate filtered signal with said harmonic signal.

8. A spacecraft according to claim 1 wherein said orbit rate bandpass filter means is tuned to said fundamental orbital rate, and further comprising:
    second bandpass filter means tuned to a frequency corresponding to a harmonic of said orbital rate for producing a harmonic signal; and
    further coupling means coupled to said orbit rate bandpass filter means, to said second bandpass filter means, and to said feedback coupling means, for coupling said second bandpass filter means in parallel with said first bandpass filter, whereby said feedback control loop responds to disturbances both at said orbital rate and at said harmonic of said orbital rate.

9. A spacecraft according to claim 8, wherein said second bandpass filter means is tuned to the second harmonic of said orbital rate.

10. A spacecraft according to claim 9, wherein said second bandpass filter means is tuned to 23.2 μHz.

11. A spacecraft according to claim 1, wherein said coupling means comprises phase correction means coupled with said orbit rate bandpass filter means for phasing said feedback control loop for degeneration of disturbance torques occurring at said orbit rate.

12. A spacecraft according to claim 1, further comprising:
    first phase correction means coupled with said orbit rate bandpass filter means and with at least a yaw control portion of said torquing means, for phasing said feedback control loop for degeneration of yaw disturbance torques occurring at said orbit rate; and second phase correction means coupled with said orbit rate bandpass filter means and with at least a roll control portion of said torquing means for phasing said feedback control loop for degeneration of roll disturbance torques occurring at said orbit rate.

13. A spacecraft according to claim 12, further comprising:

second bandpass filter means tuned to a frequency corresponding to the second harmonic of said orbital rate of said spacecraft; and wherein said feedback control loop comprises means for coupling said second bandpass filter means to said roll angle sensing means and to said torquing means, whereby said feedback control loop is responsive to roll disturbance torques occurring at said orbit rate and said second harmonic of said orbit rate.

14. A spacecraft according to claim 13, further comprising third and fourth phase correction means coupled with said roll and yaw portions, respectively, of said torquing means, and with said second bandpass filter means, for phasing said feedback control loop for degeneration of both said roll and yaw disturbance torques occurring at said second harmonic rate.

15. A spacecraft according to claim 1, wherein said first control means further provides integral feedback for providing PI control of said yaw of said spacecraft.

16. A method for controlling at least the yaw of a spacecraft in orbit about a heavenly body, comprising the steps of:

generating sensed roll signals representative of the roll of said spacecraft relative to said heavenly body;

filtering said roll signals at a frequency corresponding to the orbital rate of said spacecraft about said heavenly body to thereby produce orbit-rate signals; and applying said orbit-rate signals to torquing means associated with said spacecraft in a feedback manner for reducing at least the yaw of said spacecraft.

17. A method according to claim 16, further comprising the step of phasing said orbit-rate signals applied to said torquing means for degeneration of yaw disturbance torques.

18. A method according to claim 16, further comprising the steps of:

filtering said roll signals at a frequency corresponding to a harmonic of said orbital rate to thereby produce harmonic signals; and applying said harmonic signals to said torquing means together with said orbit-rate signals for reducing at least said yaw of said spacecraft.

19. A method according to claim 18, further comprising the steps of:

phase adjusting said orbit-rate signals and said harmonic signals to form first and second roll control signals adjusted for degeneration of roll; and applying said first and second roll control signals to a roll controlling portion of said torquing means for reducing roll disturbances.

20. A method according to claim 16, further comprising the step of:

applying signals including at least a component proportional to said sensed roll signals to said torquing means for proportional control.

* * * * *